United States Patent
Miller et al.

(10) Patent No.: US 9,904,527 B1
(45) Date of Patent: Feb. 27, 2018

(54) OPTIMIZING API IMPLEMENTER PROGRAMS USING FINE-GRAINED CODE ANALYSIS

(71) Applicant: Amazon Technologies, Inc., Seattle, WA (US)

(72) Inventors: Konrad Jan Miller, Seattle, WA (US); Michael Tautschnig, London (GB)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/236,116

(22) Filed: Aug. 12, 2016

(51) Int. Cl.
  *G06F 9/45* (2006.01)
  *G06F 9/445* (2006.01)
  *G06F 9/44* (2018.01)

(52) U.S. Cl.
  CPC ............... *G06F 8/443* (2013.01); *G06F 8/60* (2013.01); *G06F 8/71* (2013.01)

(58) Field of Classification Search
  None
  See application file for complete search history.

(56) References Cited

U.S. PATENT DOCUMENTS

| | | | |
|---|---|---|---|
| 5,999,737 | A | 12/1999 | Srivastava |
| 7,120,572 | B1 | 10/2006 | Liang |
| 7,543,284 | B2 | 6/2009 | Bolton et al. |
| 7,600,222 | B2 * | 10/2009 | Wilt ............ G06F 8/447 717/146 |
| 7,624,449 | B1 | 11/2009 | Perriot |
| 8,510,596 | B1 * | 8/2013 | Gupta ............ G06F 11/073 714/15 |
| 2002/0013938 | A1 | 1/2002 | Duesterwald et al. |

OTHER PUBLICATIONS

U.S. Appl. No. 15/199,497, filed Jun. 30, 2016, Anthony Nicholas Liguori et al.
U.S. Appl. No. 15/199,489, filed Jun. 30, 2016, Anthony Nicholas Liguori et a.
U.S. Appl. No. 15/199,479, filed Jun. 30, 2016, Anthony Nicholas Liguori et al.
Linda Northrop, "Software Product Lines Essentials", Software Engineering Institute, 2008, pp. 1-85.
Donald E. Porter et al., "Rethinking the Library OS from the Top Down", ACM, ASPLOS'11, Mar. 5-11, 2011, pp. 291-304.
Andrew Baumann, et al.,"Composing OS Extensions Safely and Efficiently with Bascule", ACM Eurosys '13, Apr. 15-17, 2013, pp. 1-14.

(Continued)

*Primary Examiner* — Chuck Kendall
(74) *Attorney, Agent, or Firm* — Robert C. Kowert; Meyertons, Hood, Kivlin, Kowert & Goetzel, P.C.

(57) ABSTRACT

Based on source code analysis of an API-invoker program, an expendable set of source code sections of an API-implementer program is identified. The expendable set corresponds to operations which are not expected to be performed on behalf of the API-invoker program at a particular computing environment. An optimized binary version of the API-implementer program is generated, which does not include executable code corresponding to the expendable set. The optimized binary version is transmitted to the computing environment for deployment.

20 Claims, 10 Drawing Sheets

(56) References Cited

OTHER PUBLICATIONS

"CBMC: Bounded Model Checking for ANSI-C", CBMC, Version 1.0, 2010, pp. 1-75.
"Drawbridge-Microsoft Research", Retrieved from URL: http://research.microsoft.com/en-us/projects/drawbridge on Jun. 22, 2016, pp. 1-4.
Anil Madhavapeddy, et al., "Unikernels: Rise of the Virtual Library Operating System", ACM Queue, 2013, pp. 1-15.
Wikipedia, "Return-oriented programming", Retrieved from URL https://en.wikipedia.org/wiki/Return-oriented_programming on Jun. 22, 2016, pp. 1-5.
Mirage OS, "Technical Background of MirageOS (technical-background)—Documentation and guides", Retrieved from URL: https://mirage.io/wiki/technical-background, pp. 1-5.

\* cited by examiner

OPTIMIZING API IMPLEMENTER PROGRAMS USING FINE-GRAINED CODE ANALYSIS

BACKGROUND

As more and more computing applications are implemented in distributed environments, where a variety of diverse platforms at which application components run may be accessed via the Internet or other networks, security and resource footprint size are increasingly important concerns. These concerns may be particularly significant in various types of virtualized computing environments, and also in environments in which lightweight or portable devices (e.g., devices which form the "Internet of things") with small memory capacities and/or limited computational capacities are employed.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource. Instantiating several different virtual machines on the same host may also help increase the overall hardware utilization levels at a data center, leading to higher returns on investment.

A respective virtualization manager, which may for example include an administrative virtual machine instance and/or a hypervisor, may be installed on each virtualization host in various virtualization environments. The virtualization manager may be responsible, among other tasks, for starting/stopping guest virtual machines on the hosts on behalf of customers, acting as the intermediary between the guest virtual machines and various hardware components of the host and the network, collecting metrics pertaining to the guest virtual machines, and enforcing security rules. From the perspective of the operator of the virtualization environment, the resources consumed by the virtualization manager (e.g., host CPU cycles, host memory, etc.) may tend to limit the number of guest virtual machines that can be instantiated on a host, and thereby reduce the operator's monetization level for the host hardware and associated infrastructure. In addition, in at least some cases administrative operations performed by the virtualization manager to support the guest virtual machines may have a tendency to interfere with the performance of time-sensitive customer applications. For obvious reasons, the operator of a virtualized computing service may need to ensure that the opportunities for intruders (or malicious software introduced into guest virtual machines) to compromise the applications of legitimate users of virtualization hosts is minimized. As such, designing a virtualization manager that efficiently meets the security and functional requirements of modern virtualization environments may represent a nontrivial challenge. Similar security and resource usage limitation requirements may also apply to various other computing devices and environments, including wearable computing devices, smart phones, environmental sensors and the like.

Figure 1:
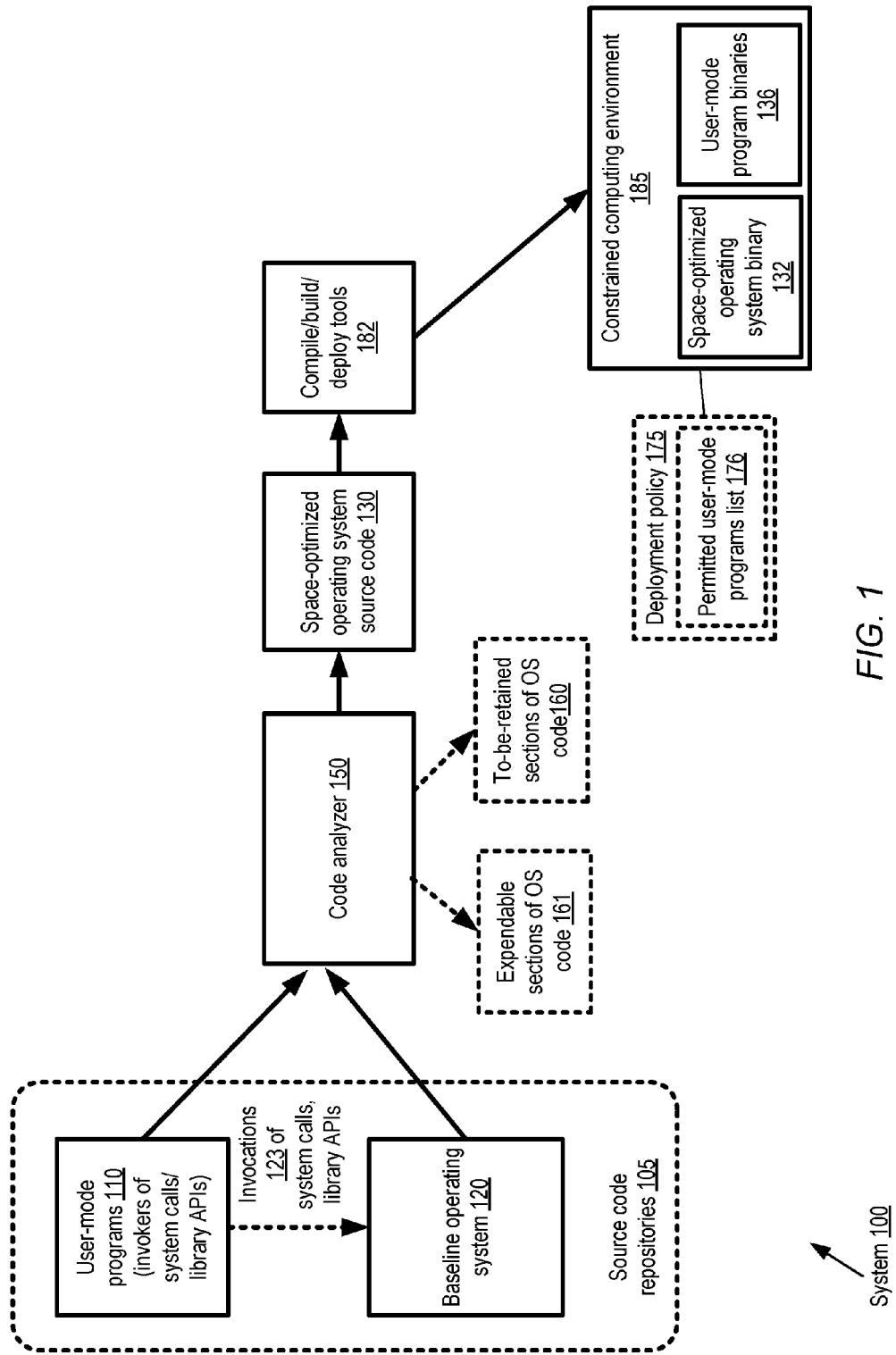
FIG. 1 illustrates an example system environment in which operating systems intended to run in constrained computing environments may be optimized based on fine-grained analysis of user-mode programs, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for optimizing operating systems and other API-implementer programs using fine-grained code analysis are described. The terms "API-implementer program", "API-provider program" or "library-provider program", as used herein, may refer to a software program which implements a set of (typically but not necessarily public) application programming interfaces (APIs) (which may be grouped into one or more "libraries") which may in general be invoked by a variety of other software programs. In many cases, an API-implementer program may be designed to act as a long-running server, responding to numerous API invokers or consumers, at least some of which may not necessarily have been developed at the time that the APIs were initially implemented or made available. In at least some cases, the API-invoker programs (the programs from which the APIs are called) may typically run at a different privilege level or processing mode than the API-implementer program: for example, various operating system processes may run in the "kernel" or "privileged" mode (enabling them to access resources such as input/output devices), while application program processes which utilize operating system APIs may run in a "user" mode (from which direct access to at least some low-level resources may be prohibited). Although an operating system is used as the example optimization target in much of the following description, other API-implementer programs may be optimized using similar techniques in various embodiments. Examples of such other API-implementers may include middleware programs (e.g., cluster management software programs which provide a single unified view of the separate memories of multiple cluster nodes to applications, virtual machine programs such as those used for programs written in the Java™ programming language, etc.), standard libraries (e.g., the C standard library used for programs written in the C programming language, graphics libraries), etc.

The security constraints and/or resource constraints of some computing environments may spur the development and deployment of optimized API-implementer programs. For example, for security and/or user resource usage related reasons, only a small set of user-mode programs of a hypervisor may be deployed as part of a virtualization manager at a virtualization host of a network-accessible computing service, as described below in further detail with respect to various embodiments. No other user-mode programs may be expected to be included in the hypervisor (or installed by users on the virtualization host) under normal operating conditions, and the hypervisor itself may be responsible for starting up any other user mode programs such as guest virtual machines which are to run on the virtualization host, and/or new instances of one or more of the hypervisor programs themselves. In such a scenario, while a baseline operating system which could be used by the hypervisor may support hundreds or thousands of system calls, only a small subset of the system calls may actually be invoked by the user-mode components of the hypervisor. As such, it may be possible to generate a modified version of the operating system which only includes code for the subset of system calls that are expected to be invoked by the user-mode components of the hypervisor. Each of the virtualization hosts of the virtualized computing service may be considered an example of a respective constrained computing environment—e.g., because no additional programs (other than the hypervisor components, or processes started up by the hypervisor components) may be allowed to use the CPUs of a given virtualization host. In at least some embodiments, the execution environment within which the hypervisor runs may also be designated as a constrained computing environment because limits may be set on the amount of memory that can be consumed by the hypervisor. In other embodiments, as discussed below, constrained computing environments may include various small-footprint or small-form-factor devices such as wearable devices, embedded systems used for vehicle control, environment sensors, and so on. Generally speaking, a computing environment may be designated as a constrained environment for any combination of a variety of reasons—e.g., because only a small amount of resources of a particular type (such as memory) are either available or targeted for use, because only a small well-defined set of programs are expected to be executed, and so on.

According to some embodiments, a set of API-invoker programs (e.g., user-mode programs that collectively represent at least part of a hypervisor) which are to be deployed at a particular type of constrained computing environment may be identified, e.g., at a code analysis and deployment subsystem (CADS) or a code analysis/deployment tool (CADT). The source code of the API-invoker programs, as well as the source code of an API-implementer program (such as an operating system) which is going to be used by the API-invokers, may be available to the code analysis and deployment subsystem in some embodiments. In various embodiments, based at least in part on a fine-grained analysis of source code of the API-invoker programs, at least two types of sections of the source code of the API-implementer program may be identified: a retention set and an expendable set. The retention set may correspond to code for operations to be performed on behalf of the API-invokers in the constrained computing environment, while the expendable set may correspond to code for operations which are not expected to be performed on behalf of the API-invokers. In some embodiments, the retention set and the expendable set may be mutually exclusive and exhaustive with respect to a source code repository of the API-implementer—i.e., each line of code of an operating system may be designated as belonging to exactly one of the two sets. In such embodiments, the determination of the contents of the two different sets of code sections may boil down to identifying just one of the sets (e.g., the retention set or the expendable set), since the second set would be the complement of the first set.

The granularity at which the classification of source code is performed may differ from one embodiment to another—e.g., in some embodiments, statement-level analysis or instruction-level analysis and classification may be performed, in other embodiments the analysis may be performed at the level of APIs, functions or methods, and so on. In one embodiment in which statement-level analysis and classification is performed, it may be the case that within a given function or method, one statement may be placed in the retention set while a different statement may be placed in the expendable set. In various embodiments, in order to classify one or more source code sections of the API-implementer program, a range of parameter values which may be passed by the API-invokers during the invocation of one or more APIs may be identified. For example, if an API function1 with an integer parameter param1 is invoked, and function1 contains a conditional branch statement (such as an if-then-else statement) based on param1's value, the range of possible values of param1 that are passed by the invoker may help determine which branched-to statements (e.g., code corresponding to the "then" in the if-then-else example, or code corresponding to the "else") should be designated as expendable or retained. In at least some embodiments, API-implementer optimizations of the kinds discussed herein may be performed (e.g., iteratively) at several different layers of a given software stack. For example, an application program App1 may invoke APIs implemented at a middleware program MP1, and MP1 may in turn invoke APIs implemented at an operating system OS1. An optimized version of MP1, called for example MP1-opt, may be generated, catering to the specific requirements of App1 in a first stage of the optimization. Based on the specific APIs of OS1 that are used in MP1-opt (and/or directly from App1), an optimized version OS1-opt of the operating system may be generated. Generally speaking, such optimizations may be performed at any number of layers of a software stack, depending on the application architecture and the APIs invoked at various layers.

After the expendable set and/or the retention set is identified, a space-optimized binary version of at least a portion of the API-implementer program may be prepared in various embodiments, to be deployed for use by the one or more API-invokers at the constrained computing environment. The space-optimized binary version may include executable code corresponding to the retention set and exclude at least some executable code corresponding to the expendable set. In some embodiments, the task of generating the space-optimized binary version may be accomplished at least in part by modifying one or more configuration files used during compilation (e.g., similar to "make" files used for C-language program compilation or Java™ program compilation). In at least one embodiment, at least some portions of source code (e.g., some set of tokens of the programming language being used) may be removed or deleted from the original or baseline repository of source code of the API-implementer program, creating a modified source code repository which can be used to compile the binary version. In some scenarios, one or more portions of the API-implementer program's source code may be replaced by different source code (e.g., condition predicates for branching statements may be modified). In one embodiment, a small amount of code that can be used to track unexpected invocations or unexpected parameters may be introduced into the baseline source tree or repository, as discussed in further detail below.

In at least some embodiments, the API-invoker programs may be combined with the optimized binary version of the API-implementer program in a single package prior to deployment. The optimized binary of the API-implementer and/or the binary versions of the API-invokers may then be deployed to one or more targeted instances of the constrained computing environment in various embodiments. There, the API-invoker programs and the API-implementer program may potentially run for long periods of time, e.g., until an update to one or more of the programs is required. The use of a single combined deployable package comprising binaries of the API-invoker programs and the API-implementer program may help to avoid the possibility of incompatibilities which may arise if the binaries of the API-invoker programs and the API-implementer programs were deployed independently. In at least some embodiments, a live update technique may be used at the constrained computing environment—e.g., a hypervisor packaged together with an optimized kernel component may be configured to replace itself at a virtualization host with a newer version without restarting the host and without overwriting the memory allocated to guest virtual machines. In at least some embodiments, multiple API-implementer programs may be optimized and/or deployed together with a set of API-invoker programs which utilize their APIs—that is, there may be an M:N relationship between the number of API-implementer programs and the number of API-invoker programs used at a constrained computing environment.

Example System Environment

FIG. 1 illustrates an example system environment in which operating systems intended to run in constrained computing environments may be optimized based on fine-grained analysis of user-mode programs, according to at least some embodiments. As shown, system 100 may comprise a code analyzer 150 and a set of tools 182 which can collectively be used to compile, build and initiate a deployment of various types of executable programs derived from one or more source code repositories 105. In some embodiments, the code analyzer 150 and the tools 182 may collectively form part of a code analysis and deployment subsystem established for one or more network-accessible services of a provider network (e.g., a public cloud environment), such as a virtualized computing service discussed in the context of FIG. 2. In other embodiments, the code analyzer and/or one or more of the other tools may be implemented as standalone tools, not necessarily affiliated with or part of a network-accessible service as such.

In the embodiment depicted in FIG. 1, one or more sets of API-invoker programs may be designed for deployment at constrained computing environments. For example, a particular constrained computing environment 185 (which may comprise, for example, one or more servers with one or more processors, memory, I/O devices and the like) may have an associated deployment policy 175 constraining or limiting the kinds of programs which can be run. As shown, deployment policy 175 may indicate a list of permitted user-mode programs 176. In some embodiments, only instances (e.g., respective processes) corresponding to the programs whose names or identifiers are on list 176 may be run at the computing environment. In at least some embodiments, a constrained computing environment's deployment policy 175 may permit additional instances of user-mode programs to be launched (e.g., by forking child processes) by the initially-deployed user-mode programs at the constrained computing environment. The deployment policy 175 may be an implicit property of the constrained computing environment (or the deployment-related tools 182) in some embodiments—that is, while the restrictions of the deployment policy may be enforced, the policy need not necessarily be stored in a persistent form. Generally speaking, constrained computing environments may enforce any combination of a variety of restrictions—e.g., there may be strict restrictions on the kinds of programs that can be run (as in FIG. 1), the amount of memory which can be consumed by a program or a set of programs, the maximum number of processes which can run, and so on.

The code analyzer 150 may obtain an indication of one or more API-invoker user mode programs 110 which are eventually to be deployed at constrained computing environment 185 in the depicted embodiment. In one implementation, the names of the user mode programs 110 may be indicated in a parameter file, for example, or may be passed to the code analyzer 150 via an API of the code analyzer. The user-mode programs 110 may invoke some number of APIs or system calls implemented by a baseline or standard version 120 of an operating system, as indicated by arrow 123. The code analyzer 150 may be responsible for examining the source code of the user-mode programs 110 and/or operating system 120 in the depicted embodiment, and for identifying portions of the operating system code which may not be required in the constrained computing environment (since those portions may correspond to operations that are not required by the user-mode API invokers at the targeted environment).

In various embodiments, the source code of the API invokers and/or the operating system may be analyzed at the statement level, or even at the level of individual instructions. Based on the analysis, expendable sections 160 and to-be-retained sections 161 of the operating system source code may be identified by code analyzer 150 in the depicted embodiment. The sections 161 to be retained (which may correspond to operations expected to be performed on behalf of the API-invokers 110 at the constrained computing environment 185) may also be referred to as a "retention set" of the API-implementer code herein. The expendable sections 160 of the operating system source code (which correspond to operations that are not expected to be performed on behalf of the API-invokers 110 at the constrained computing environment 185) may be referred to as the "expendable set" of the API-implementer code. The classification of the source code may be performed at a fine-enough granularity in some embodiments that a particular statement of a given function or method may be designated as expendable, while another statement within the same function or method may be designated as part of the retention set. The retention set and the expendable set may be complements of one another in at least some embodiments, and may collectively form the entire source code of the baseline operating system; as such, explicitly determining just one of the two sets (the retention set or the expendable set) may result in automatically identifying the other set.

After the expendable and to-be-retained sections are identified, a modified version 130 of the baseline operating system source code may be generated, e.g., by eliminating at least some of the expendable sections (and in some cases implementing some additional minor modifications as discussed below). Depending on the relative sizes of the expendable and to-be-retained sections, the modified version 130 may in some cases be substantially smaller than the original or baseline version 120, and may therefore be referred to as a space-efficient version. An executable or binary space-efficient version 132 of the operating system may be prepared, e.g., with the help of the compile/build/deploy tools 182 in the depicted embodiment, and transmitted to the constrained computing environment 185. In at least some embodiments, binary or executable versions of the user mode API-invoker programs 136 and the binary version 132 of the space-optimized operating system may be combined into a single deployable package or unit. As a result of deploying the optimized version of the operating system, the restrictions of the deployment policy 175 may be made more easily enforceable, and the resources consumed by the operating system itself within the constrained computing environment may also be reduced. Because the optimized version of the operating system may exclude code which could be used for any other APIs or operations than those used by the specific set of API-invokers intended for the constrained computing environment, the opportunities for malicious code to compromise the constrained computing environment may be reduced substantially (e.g., compared to scenarios in which the baseline version of the operating system may have been deployed instead).

It is noted that the code optimization techniques discussed in the context of FIG. 1 may be employed for a variety of different combinations of constrained computing environment types, API-invoker programs and API-implementer programs. Thus, while a virtualization host is used as an example of a constrained computing environment in a large part of the remainder of this description, with the hypervisor used as the example of the API-invoker and an operating system used as the example of the API-implementer, a given code optimizer and associated compilers, build tools and deployment tools may be used with equal success to generate optimized API-implementers for other environments including various types of portable or small-memory systems, some of which are discussed below in the context of FIG. 8. As mentioned above, standard libraries and/or middleware programs may represent other examples of API-implementers in some embodiments. At least in some environments, a given program may be both an API-implementer and an API-invoker. As mentioned above, in one scenario, an application program App1 may invoke APIs implemented at a middleware program MP1, and MP1 may in turn invoke APIs implemented at an operating system OS1. In this example, MP1 is an API-implementer with respect to App1 (with App1 being an API-invoker with respect to MP1), and OS1 is an API-implementer with respect to MP1 (with MP1 being an API-invoker with respect to OS1). Respective optimized versions of API-implementers may be generated in such scenarios for each corresponding set of API-invokers using fine-grained source code analysis of the kind discussed herein, e.g., with the analysis starting with the {App1, MP1} combination first, and then proceeding to the {Optimized-MP1, OS1} combination. Of course, in some cases App1 may also invoke one or more OS1 APIs in the above example, in which case the combination {App1+Optimized-MP1, OS1} may be analyzed for optimization.

Virtualized Computing Service Example

Figure 2:
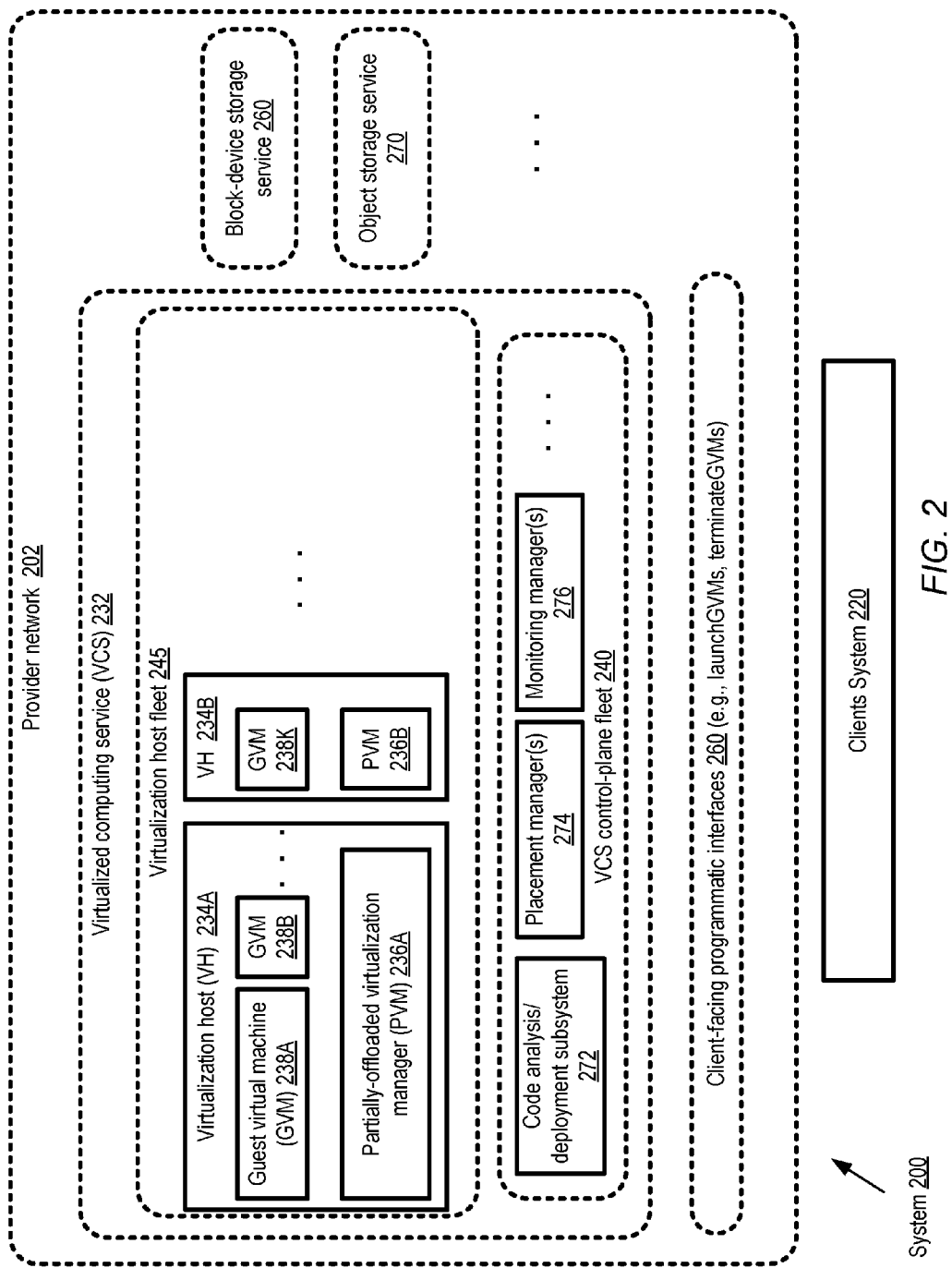
FIG. 2 illustrates an example system environment in which partially-offloaded virtualization managers which include optimized operating systems may be employed at a virtualized computing service, according to at least some embodiments.

In some embodiments, the code optimization techniques discussed above may be used for at least some hosts of a virtualized computing service. FIG. 2 illustrates an example system environment in which partially-offloaded virtualization managers which include optimized operating systems may be employed at a virtualized computing service, according to at least some embodiments. As shown, system 200 comprises a provider network 202 at which a plurality of network-accessible services may be implemented on behalf of various clients 220. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. The services of the provider network 202 may include, among others, a virtualized computing service (VCS) 232 as well as a number of storage-related services including a block-device storage service 260 (which provides storage volumes via a block-device level programmatic interface) and an object storage service 270 (which exposes a web-service interface for accessing unstructured storage objects) in the depicted embodiment. A number of other services, such as one or more types of database services, a machine learning service, and the like may also be supported at the provider network in various embodiments. Some of the services may utilize other services to fulfill client requests—e.g., at least a portion of the persistent storage used for guest virtual machines of the virtualized computing service may be managed via one or more of the storage services in the depicted embodiment, and so on.

The VCS 232 may comprise a virtualization host fleet 245 and a control plane fleet 240 in the depicted embodiment. Virtualization hosts 234 of the host fleet 245 may be employed to instantiate guest virtual machines (GVMs) 238 on behalf of clients 220 of the VCS. For example, virtualization host 234A may comprise GVMs 238A and 238B, while virtualization host 234B comprises GVM 238K. The GVMs may be utilized by clients 220 to run a variety of applications, some of which may involve the use of resources of other services of the provider network 202, and/or may involve the use of resources outside the provider network 202.

The software, firmware and/or hardware components that collectively enable and administer guest virtual machines at a virtualization host may be referred to as a virtualization manager herein. At least some of the virtualization hosts 234 may comprise a respective partially-offloaded virtualization manager (PVM) 236 in the depicted embodiment. For example, host 234A comprises PVM 236A, host 234B comprises PVM 236B, and so on. The term "partially-offloaded" may be used herein to describe virtualization managers which have the following characteristic in various embodiments: at least some of the virtualization management tasks required for supporting guest virtual machines on the virtualization host may not be executed using the primary CPUs or cores of the virtualization host. Such tasks may be designated as "offloaded" tasks, reducing the virtualization management-related overhead on the physical CPUs of the host. Instead of using the CPUs of the host, one or more processors located on an offload card (e.g., a card accessible from the primary CPU(s) via a bus implementing a version of the Peripheral Component Interconnect —Express or PCI-E standard) may be employed for at least some of the offloaded tasks in various embodiments. In at least some embodiments in which PVMs are used, the overall responsibilities for managing the administration of local guest virtual machines 238 of the virtualization host 234 may be split among an opportunistic hypervisor (which uses the primary CPUs of the virtualization host) and one or more other virtualization management components which may run on processors mounted on offload cards (such as PCI-E cards or other cards connected via peripheral interconnects). The opportunistic hypervisor may comprise one or more user-mode processes which invoke a set of APIs of an operating system run on the virtualization host. The hypervisor may be described as being opportunistic in that the hypervisor utilizes a physical CPU of the host primarily when given the opportunity to do so as a result of a voluntary relinquishment of the physical CPU by a guest virtual machine. A CPU may be given up voluntarily, for example, when the guest virtual machine needs to perform an input/output operation, read a timer value, or perform some other operation which cannot be completed by the guest virtual machine on its own.

The PVM approach may be designed to reduce virtualization management workload which consumes resources (such as the main CPUs and main memory) of the virtualization hosts that could instead be deployed for client-requested GVMs. In various embodiments, virtualization management tasks such as network protocol processing (e.g., with respect to encapsulation protocols being used at the VCS) and even memory allocation for the guest virtual machines may be performed entirely or primarily at the offloaded virtualization manager components as discussed below. The CPU usage and memory footprint of the hypervisor itself may be minimized in various embodiments—e.g., most or all of the use-mode hypervisor subcomponents may remain quiesced or idle by default, performing virtualization management tasks primarily if and when physical CPUs are relinquished by the guest virtual machines 238. As a result of the default-quiesced mode of hypervisor behavior, in which GVMs are (except under exceptional circumstances) allowed to consume physical CPU cycles for as long as needed without being interrupted by the hypervisor, the variation in the performance of various application-level operations may be reduced. Live updates of various PVM components (including the hypervisor) may be supported in some embodiments, with the overall goal of avoiding reboots of the guest virtual machines when virtualization manager components need to be replaced or upgraded. It is noted that at least in some embodiments, not all the virtualization hosts of fleet 245 may utilize partially-offloaded virtualization managers. For example, some hosts may comprise respective administrative virtual machines and/or full-fledged non-opportunistic hypervisors, and may not include offload cards which can be used to divert virtualization management processing away from the primary CPUs.

The control plane fleet 240 of the VCS may comprise a number of subcomponents in the depicted embodiment, including for example code analysis and deployment subsystem 272, placement managers 274, monitoring managers 276 and the like. The code analysis and deployment subsystem 272 may be responsible, for example, for generating and deploying space-optimized versions of the operating systems whose APIs are invoked by user-mode components of the opportunistic hypervisors using techniques similar to those discussed in the context of FIG. 1. For example, from a baseline operating system source code repository, a retention set comprising code for operations used by the hypervisor user-mode processes may be identified, and a space-efficient version of the operating system which excludes code for operations not needed by the hypervisor may be generated and deployed. The placement managers 274 may be responsible for determining exactly which virtualization host(s) are to be used to fulfill a given client's request for one or more GVMs 238. In some cases, virtualization hosts may be used in a multi-tenant mode, with GVMs of several different clients instantiated on a single virtualization host, while in other cases, at least some of the hosts may be dedicated to GVMs of a single client (single-tenant mode). Monitoring managers 276 may collect various metrics (e.g., performance measurements, health state indicators and the like) associated with individual GVMs 238 and/or hosts 234, including metrics which may be initially obtained by subcomponents of the hypervisor and/or by the offloaded virtualization manager components.

The VCS 232 may implement a set of client-facing programmatic interfaces 260 (e.g., APIs, web-based consoles, command line tools, graphical user interfaces and the like) enabling clients 220 to submit requests to acquire, release and interact with guest virtual machines 238 in the depicted embodiment. For example, the equivalent of a "launchGVMs" request or command may be used to instantiate one or more GVMs 238 with specified characteristics, and the equivalent of a "terminateGVMs" command or request may be used to disable one or more of the client's GVMs. In general, a client request, received at a control plane component of the VCS 232 may be transformed into an internal format and transmitted to the PVM at the appropriate virtualization host for implementation. Within the PVM itself, in some embodiments an offloaded component may first receive the internal command/request, passing some version of the command/request on to the opportunistic hypervisor (e.g., using an asynchronous queue-based protocol so as not to interrupt the use of the host resources by GVMs) for implementation if necessary. Details of various aspects of low-overhead secure virtualization management techniques which may be employed at a VCS 232 are provided below.

Virtualization Host Components

Figure 3:
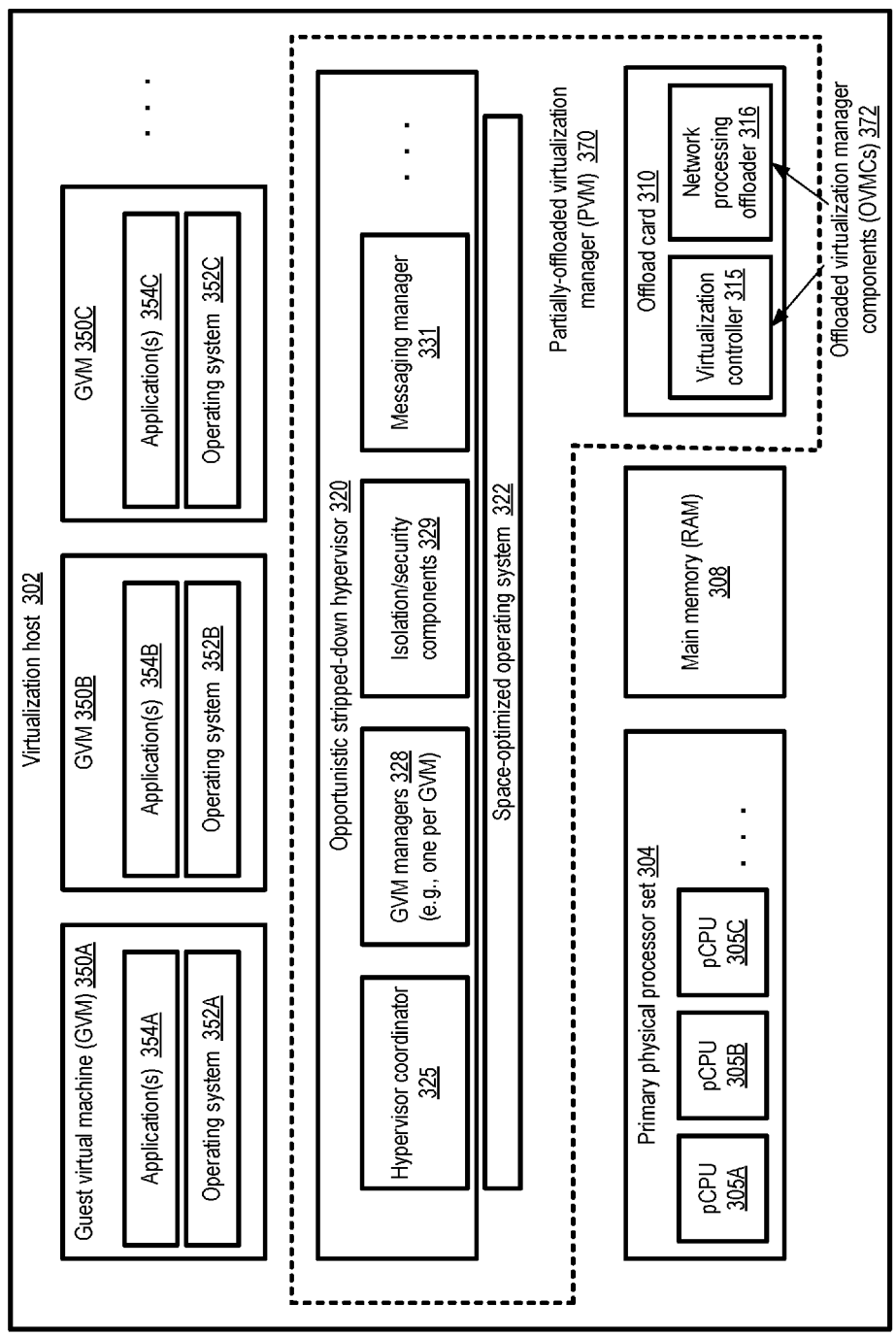
FIG. 3 illustrates example components of a virtualization host at which an optimized version of an operating system may be deployed for use by a hypervisor, according to at least some embodiments.

FIG. 3 illustrates example components of a virtualization host at which an optimized version of an operating system may be deployed for use by a hypervisor, according to at least some embodiments. As shown, a virtualization host 302 may comprise a primary physical processor set 304, a main memory (e.g., one or more modules of random access memory or RAM) 308, a partially-offloaded virtualization manager (PVM) 370 and zero or more guest virtual machines GVMs 350, such as GVMs 350A-350C. (Virtualization host 302 may also comprise a number of other components, e.g., various persistent storage devices, which are not shown in FIG. 3 to avoid clutter.) The primary physical processor set 304 may comprise a number of physical CPUs (pCPUs), including pCPUs 305A-305C in the depicted embodiment. Virtualized versions of the pCPUs, called vCPUs or virtual CPUs, may be allocated to individual GVMs by the PVM 370 during the lifetime of the GVMs. Each GVM 350 may comprise a respective instance of an operation system (e.g., operating systems 352A-352C) and a set of applications (e.g., 354A-354C) being run on behalf of clients of the virtualized computing service.

The PVM 370 may comprise an opportunistic stripped-down hypervisor 320 (which uses the pCPUs) and one or more offloaded virtualization manager components (OVMCs) 372 which do not use the pCPUs in the depicted embodiment. OVMCs 372 may include, for example, a virtualization controller 315 and a network processing offloader 316. Individual ones of the OVMCs may be implemented using a respective system-on-chip design in some embodiments. Although both OVMCs 372 are shown as being incorporated within a single offload card 310 (e.g., a PCI-E card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 315 and the network processing offloader 316. The virtualization controller, as suggested by its name, may be responsible for organizing or orchestrating much of the virtualization management work performed at the host 302 in the depicted embodiment—e.g., it may be the first of the components of the PVM to boot, trigger the launches of the other components of the PVM, communicate with the VCS control plane, make memory allocation decisions with respect to guest virtual machines, and so on. The network processing offloader 316 may be responsible for implementing one or more networking protocols (including for example an encapsulation protocol used within the VCS) and acting as an intermediary between the GVMs and networking endpoints outside the virtualization host in the depicted embodiment.

Hypervisor 320 may be described as being stripped-down in the depicted embodiment because much of the work performed by at least some conventional hypervisors may be handled by the OVMCs 372 instead, thereby reducing the complexity and size of the hypervisor 320. In addition, hypervisor 320 may be designated as opportunistic because, under most circumstances, it may wait until a GVM voluntarily relinquishes control of a pCPU 305 before the hypervisor uses CPU cycles. Thus, for example, when a particular GVM 350 issues an I/O request (where the I/O is expected to take approximately time T1 to complete) and gives up a pCPU until a response to the I/O request is received, the hypervisor may take advantage of this opportunity to use the pCPU to perform one or more virtualization management tasks (which may typically take time T2, where T2<<T1) while the GVM is not expecting to use the pCPU. As such, the hypervisor 320 may have a minimal impact on the performance of applications 354 in the depicted embodiment.

The hypervisor 320 may itself comprise a number of user mode subcomponents in the depicted embodiment which invoke a set of APIs or system calls supported by an optimized operating system 322 (which represents an example of the API-implementers discussed earlier). The user-mode subcomponents may include a hypervisor coordinator 325, one or more GVM managers 328, isolation/security components 329, and/or a messaging manager 331. The hypervisor coordinator 325, individual ones of the GVM managers 328, the isolation/security components 329 and/or the messaging manager 331 may run as respective user-mode processes in at least some embodiments, and may represent examples of the API-invoker processes discussed in the context of FIG. 1. In various embodiments, at least some of these components may communicate with one another via pipes using simple, specialized protocols. The subcomponents of the hypervisor may remain passive or quiesced by default in the depicted embodiment, reacting and activating only in response to events (such as messages from other subcomponents, context switches initiated by GVMs, etc.). In some implementations, for example, several of the hypervisor subcomponents may typically remain blocked on a polling system call (such as epoll( ) or the equivalent) most of the time.

The optimized operating system 322 may provide support for various low-level operations such as the initial responses to VM exit instructions issued by the GVMs (e.g., when a GVM gives up a pCPU). The hypervisor coordinator 325, as implied by the name, may be responsible for orchestrating operations of the other subcomponents. The hypervisor coordinator 325 may, for example, implement an API which can be used for communications between the OVMCs 372 and the hypervisor, initiating GVM launches and terminations (e.g., at the request of an OVMC), exposing metrics collected by the GVM managers, providing debugging capabilities, and so on.

Each GVM manager 328 may be responsible for launching or instantiating a respective GVM based on a specification provided by the coordinator 325, monitoring metrics and logs of the GVM, and so on. In some embodiments a GVM manager 328 may also help with GVM-requested I/O operations for certain devices, e.g., by trapping GVM I/O requests and translating them to memory-mapped I/O operations completed with the help of an OVMC. In at least some embodiments, in accordance with the security-related principle of least privilege, a GVM manager 328 may drop many of its own privileges as soon as possible during the instantiation of a GVM. For example, after one or more vPCU (virtual CPU) threads have been spawned for a GVM, and the GVM's memory has been mapped, the GVM manager may disable some of its privileges to reduce the opportunity for security breaches. In one embodiment, a GVM manager 328 may check whether random samples of GVM memory are zeroed as expected (instead of checking the entire GVM memory at one time), thereby increasing the speed of bringing up GVMs. In some embodiments there may be a 1-to-1 mapping between GVM managers and GVMs, while in other embodiments a single GVM manager may be responsible for multiple GVMs.

The messaging manager 331 may act as an intermediary between the virtualization controller 315 and the hypervisor, e.g., by translating commands issued using a queue-based protocol by the virtualization controller into pipe messages within the hypervisor. The security and isolation components 329 may be responsible, for example, for scrubbing or cleaning up GVM memory when a GVM terminates, so that inadvertent sharing of data across GVMs can be avoided. It is noted that the PVM may comprise additional components (not shown in FIG. 3) in at least some embodiments, while in at least one embodiment one or more of the PVM components shown in FIG. 3 may not be required.

Hypervisor Deployment and Live Updates

Figure 4:
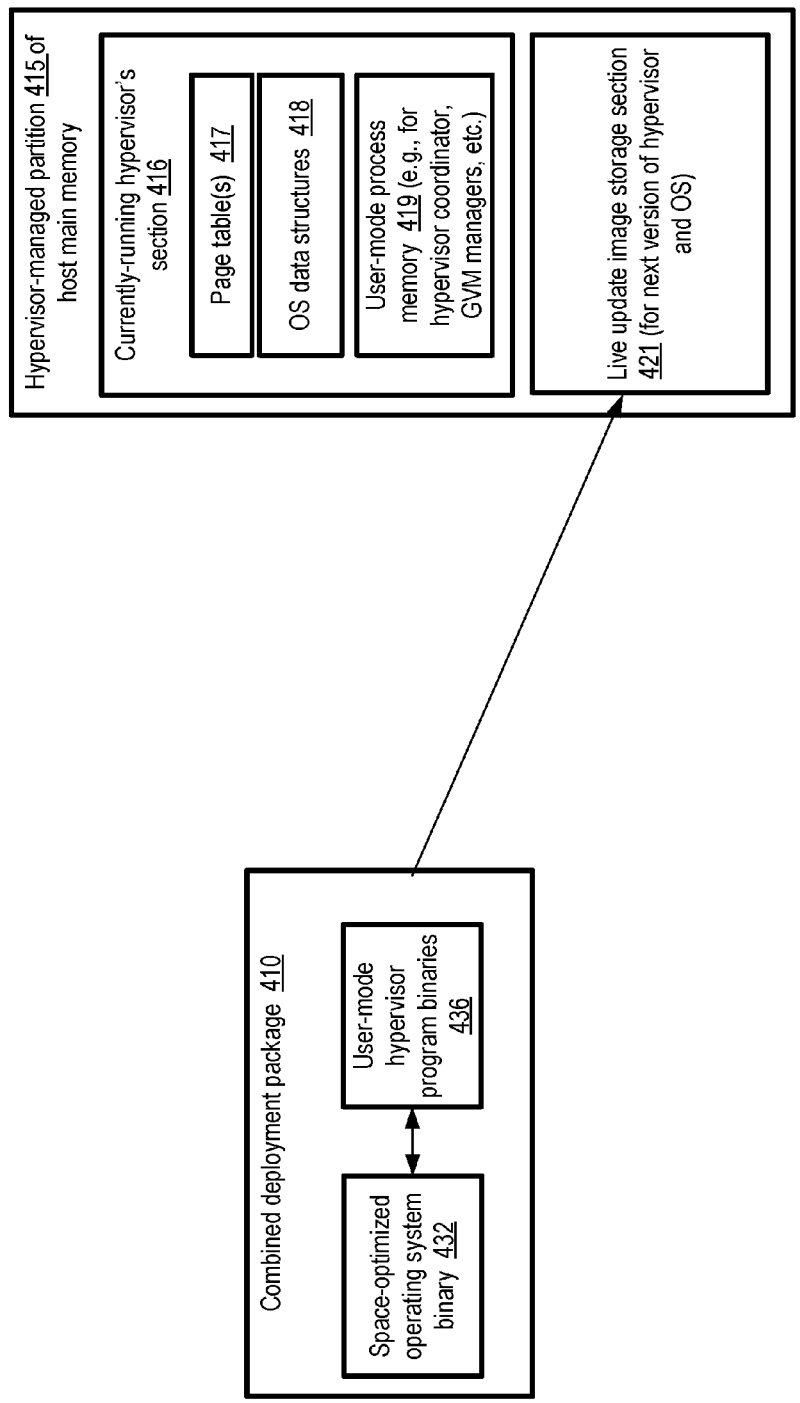
FIG. 4 illustrates a deployment of an example software package comprising an optimized operating system and user-mode components of a hypervisor, according to at least some embodiments.

In some embodiments, as mentioned above, a unified deployable package which contains binaries of the API-invoker programs and the API-implementer program may be prepared for the constrained computing environments. FIG. 4 illustrates a deployment of an example software package comprising an optimized operating system and user-mode components of a hypervisor, according to at least some embodiments. As shown, a combined deployment package 410 containing the binaries 436 of the user-mode programs included in the hypervisor as well as the optimized operating system binary 432 generated based on fine-grained code analysis techniques discussed above may be prepared, e.g., at a code analysis and deployment subsystem.

In at least some embodiments in which a partially-offloaded virtualization manager is used, the main memory of a virtualization host may be divided into two partitions: one for which object allocation decisions are made by the offloaded virtualization management components (OVMCs) such as the virtualization controller 315 of FIG. 3, and a second partition for which object allocations are managed by the hypervisor. The OVMC-managed partition may be used, for example, for guest virtual machines (i.e., the memory utilized by the GVM processes) and associated metadata and page tables, while the hypervisor-managed partition may be used for operations performed by the hypervisor use-mode programs and the corresponding optimized operating system. Such a division of memory management responsibilities may have the advantage that running GVMs may not need to be rebooted if and when the hypervisor is updated in various embodiments.

Within the hypervisor-managed partition 415 of the host main memory, one section may be used for the currently running hypervisor processes and operating system components, while another portion of the memory may be designated for use during live updates of the hypervisor. In the depicted embodiment, the currently-running hypervisor's section 416 may include, for example, one or more page tables 417 (e.g., with a smaller page table size than may be used for GVM page tables, whose locations within the OVMC-managed partition may be selected by the OVMC), various operating system data structures 418, as well as memory 419 being used by the running user-mode programs such as the hypervisor coordinator, GVM managers, etc. Section 421 of the hypervisor-managed partition may be used to store the combined deployment package 410 corresponding to the next version of the hypervisor in the depicted embodiment. For example, an OVMC such as the hypervisor controller may cause the next version to be stored in section 421, overwriting previous contents of section 421 which may have comprised the most recently updated version. During a live update, the currently-running version of the hypervisor (and associated operating system) may dynamically replace itself with the new version. While this may result in overwriting portions or all of section 416 of the memory, this would not overwrite the OVMC-managed partition of memory, and as a result the memory state of GVMs would not be affected, allowing running GVMs to survive across hypervisor updates. The live update may be triggered, for example, by the control plane of the virtualized computing service in various embodiments, and a command to initiate a live update may be transmitted from the control plane via an OVMC to the hypervisor.

Source Code Optimization Examples

Figure 5:
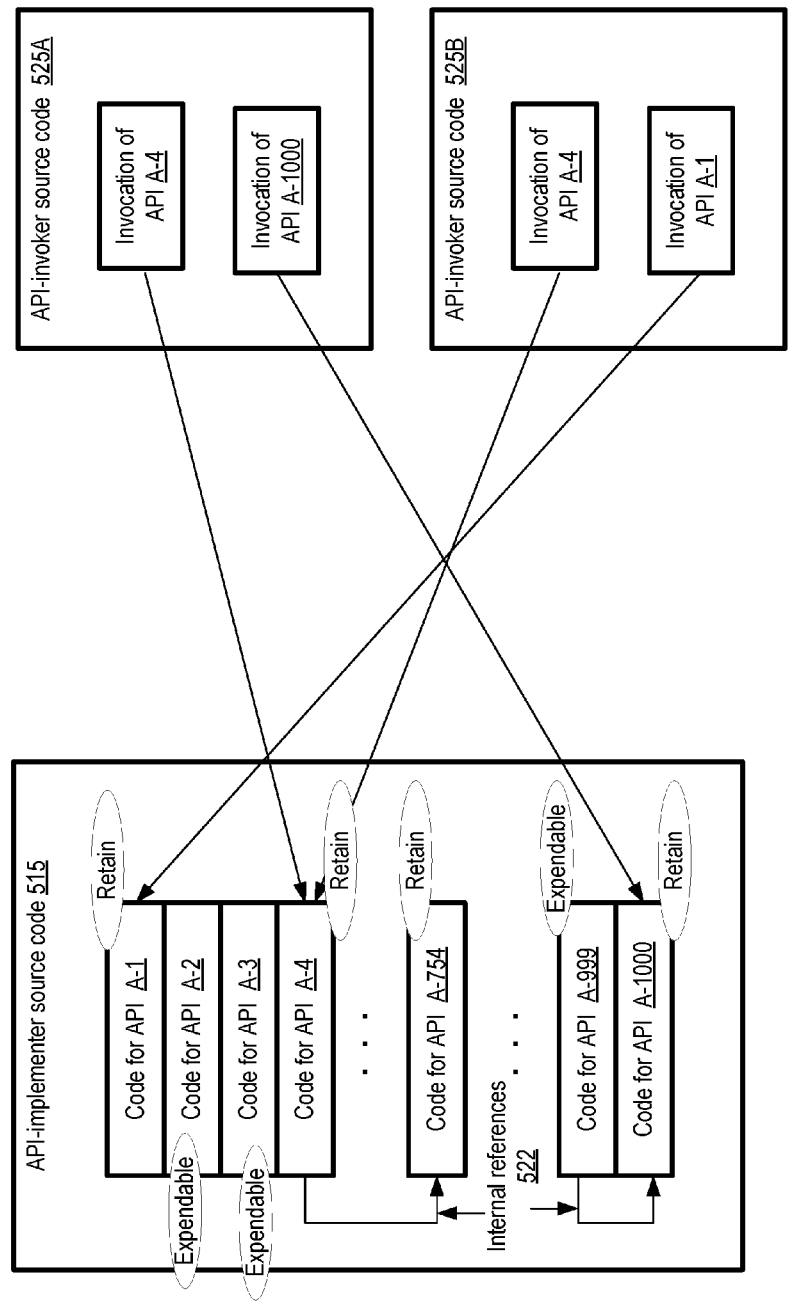
FIG. 5 illustrates an example scenario in which sections of an application programming interface (API) implementer program's code may be identified as expendable at an API granularity, according to at least some embodiments.

The analysis and classification of source code of an API-implementer program may be performed at several different levels of granularity. FIG. 5 illustrates an example scenario in which sections of an application programming interface (API) implementer program's code may be identified as expendable at an API granularity, according to at least some embodiments. An API-implementer's source code 515 may comprise code for one thousand different APIs, API-1 through API-1000 in the illustrated example. In the depicted embodiment, the code for some APIs may call code for other APIs—e.g., the code for API A-4 may include one or more invocations of code for API A-754, and the code for API A-999 may use some of the code of API-1000, as indicated by the internal references arrows 522.

To simplify the example, only two API-invoker programs are considered, each of which invoke two APIs. The source code of API-invoker 525A comprises respective calls to API A-4 and API A-1000, while the source code of API-invoker comprises respective calls to API A-4 and API A-1. As part of the analysis of the source code, a list (or other similar data structure) of those APIs which are invoked by the set of API-invoker programs may be generated. The sections of code corresponding to the invoked APIs may be designated as members of the retained set in a preliminary phase of the API-level analysis. In addition, if any of the members of the retained set invoke any additional APIs, or use code which is part of another API's implementation code, such additional APIs may also be added to the retention set in some embodiments. Thus, an API-level retention set may be populated iteratively or recursively in the depicted embodiment, starting with a first set of APIs which are called by the API-invokers, then adding a second set of APIs whose code may be used by the first set (if any of the first set APIs invoke code of any other APIs), and so on. In the depicted example, code for API's A-4, A-1 and A-1000 may be added in the first round, and code for API A-754 (which happens to be used by A-4) may be added to the retention set in a second round. After the iterative identification of the API-level retention set is complete, the remaining APIs, which are not called (either directly or indirectly) by the API-invokers may be designated as members of the expendable set. The labels "retain" and "expendable" are shown for a small subset of the thousand APIs to indicate membership in the retention set and expendable set respectively.

In some cases, the subsystem or tool responsible for optimization may be provided with a target for reducing the memory footprint of the combination of the API-implementer and the API-invokers. For example, a target memory consumption target of M megabytes may be set for an opportunistic hypervisor, assuming up to G running GVMs (since the total memory consumed may be a function of the total number of GVMs at the virtualization host). The expendable portion of the source code (identified via API-level analysis of the kinds illustrated in FIG. 5) may be large enough that removing the corresponding code may suffice to meet the memory footprint targets in some cases. However, in other cases, a more detailed level of analysis may be performed, e.g., at a statement-level granularity. It may also be the case that statement-level analysis and classification may be performed to enhance the security of the constrained computing environment, independently of memory footprint targets. For example, under the general assumption that leaving unnecessary source code in the API-implementing program only provides opportunities for security attacks, as much code as possible may be eliminated in at least some embodiments.

Figure 6:
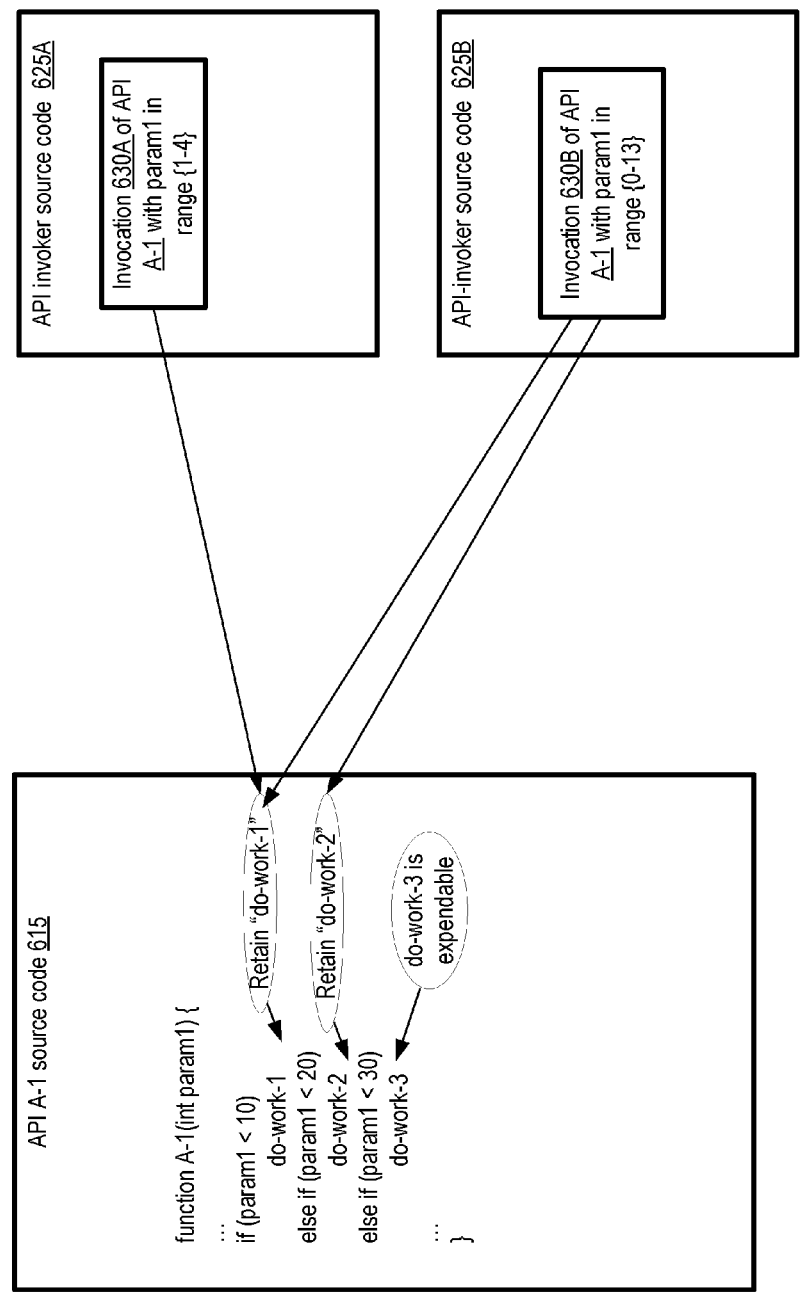
FIG. 6 illustrates an example scenario in which sections of an API-implementer program's code may be identified as expendable at a statement granularity, according to at least some embodiments.

FIG. 6 illustrates an example scenario in which sections of an API-implementer program's code may be identified as expendable at a statement granularity, according to at least some embodiments. As shown, the source code 615 of an API A-1, implemented as function A-1, comprises an if statement. If the value of the integer parameter param1 is less than 10, a code section represented in FIG. 6 by "do-work1" may be executed. If param1 has a value between 10 and 19 (inclusive), code section "do-work2" may be executed, and if param1 has a value between 20 and 29 (inclusive), code section "do-work3" may be executed in the depicted embodiment. Other conditional clauses may also exist in function A-1, e.g., for values of param1 greater than 29.

The code analyzer may determine that when A-1 is invoked from section 630A of API-invoker source code 625A, the value of the parameter param1 which is passed may lie in the range 1-4. Similarly, from invocation 630B of API-invoker source code 625B, the value of param1 may lie within a range 0-13. Such a determination of possible parameter values may involve the use of several techniques, including, for example, tracing back through the invoker source code to find values which could have been assigned to the parameter, in some cases following pointers, and so on. Assuming that the only invocations of API-1 among the API-invokers are those shown in code sections 630A and 630B, the code analyzer may determine that do-work3 (which is used only if param1 exceeds 19) is an expendable section of code, while do-work1 and do-work2 should be retained. Do-work1 may potentially be executed as a result of either invocation 630A or invocation 630B (since param1 values between 1 and 4 are possible from invocation 630A, and param1 values between 0 and 9 are possible from invocation 630B) while do-work2 may potentially be executed as a result of invocation 630B (since param1 values between 10 and 13 are also possible from invocation 630B). Consequently, in at least some embodiments, the portions of the if statement code which do not correspond to the parameter values expected to be passed may be removed from an optimized version of the API-implementer.

Figure 7:
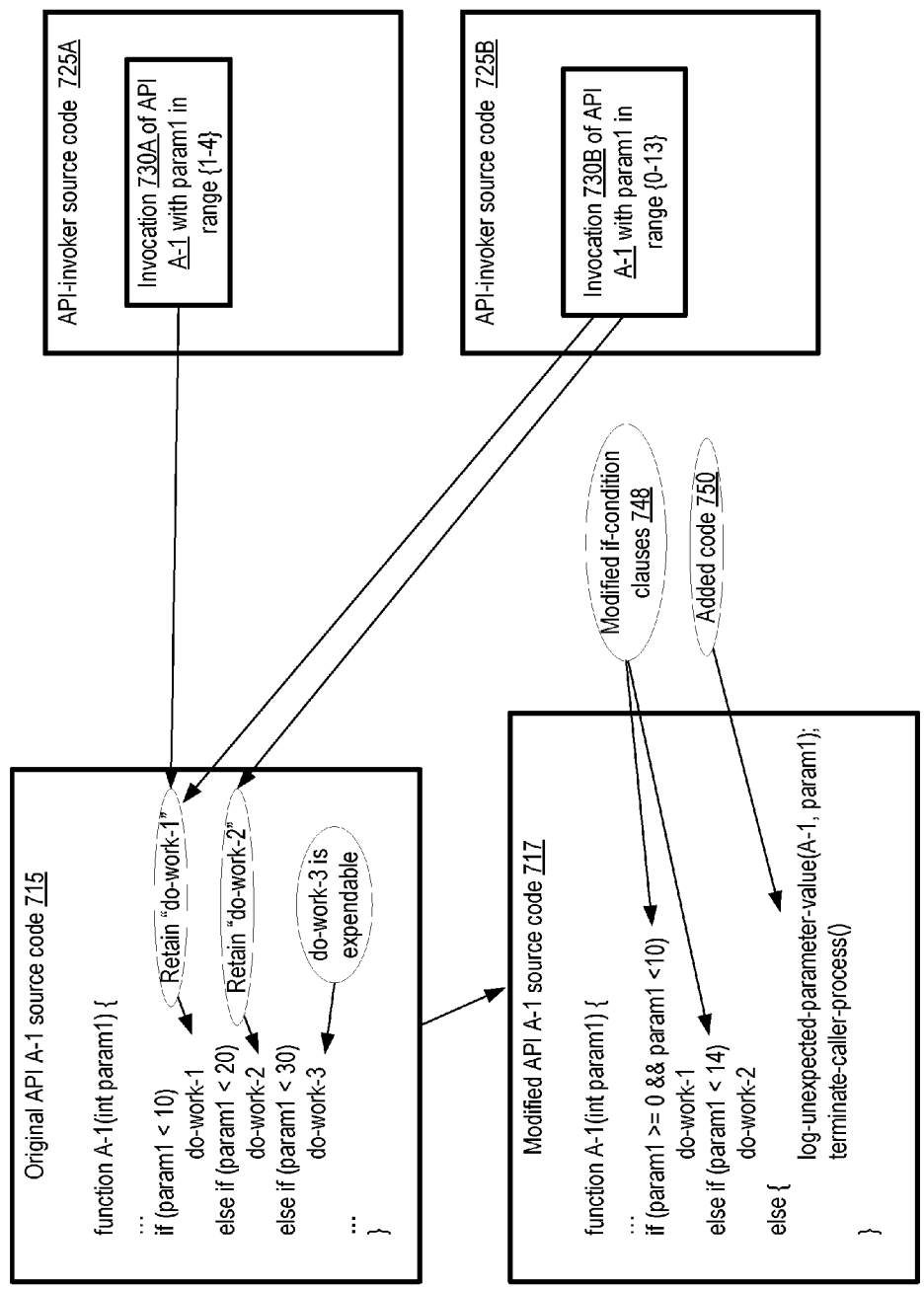
FIG. 7 illustrates an example scenario in which source code may be added to an API-implementer program as part of an optimization technique, according to at least some embodiments.

In some cases, the changes made to the API-implementer source code for optimization may include modifications, replacements or additions, in addition to or instead of removals alone. FIG. 7 illustrates an example scenario in which source code may be added to an API-implementer program as part of an optimization technique, according to at least some embodiments. In FIG. 7, the if statement and invocations of API A-1 are the same as those shown in FIG. 6. In the depicted embodiment, assuming that invocations 730A and 730B are the only calls made to the API-implementer program in the targeted constrained computing environment, the code analyzer may be able to determine that the only legal or permitted values of param1 (at the target environment) lie in the range 0-13 (based on the analysis of sections 730A and 730B of invoker source code 725A and 725B). Consequently, it may be appropriate to modify the original condition checking clauses or predicates of the if statement in API-implementer source code 715A, so that unexpected parameter values may be flagged as errors.

As such, two types of changes may be made with respect to the retained code sections do-work1 and do-work2 in the depicted embodiment, as shown in modified API A-1 source code 717. The first type of change (modified if-condition clauses 748) may affect the first two if conditions. Instead of the original clause "if (param1<10)", which may permit negative values of param1 to be passed, a stricter clause "if (param1>=0 and param1<10)" may be used, since the smallest value of param1 expected to be passed is 0. Similarly, instead of the original else-if clause "else if (param1<20)", a stricter clause "else if (param1<14)" may be used, since the maximum param1 value expected to be passed is 13.

The second kind of change, added code 750, may include statements or functions that are to be used to detect and/or respond to violations of expected invoker behavior. If param1 has a value outside the expected range 0-13, in the depicted embodiment a function log-unexpected-param1-value may be invoked, and a function terminate-caller-process may also be invoked. The first of these functions may result in a record of the unexpected parameter value being saved to some persistent store in some implementations. The second function may attempt to kill (terminate) the API-invoker process which has attempted to pass an unexpected parameter, e.g., under the assumption that if a process behaves in such a way, there is a non-zero probability that the process has been successfully "hacked" or compromised. Of course, some API-implementer programs may already include some variant or subset of the final else clause of added code 750, and if the existing variant is sufficient to cover the unexpected ranges of parameter values for the targeted constrained computing environment, additional code may not be necessary.

It is noted that although trivial examples of the kinds of API-level and statement-level changes that may be made to optimize API-implementer code have been shown in FIG. 5-FIG. 7, the concepts illustrated therein may be applied to much more complex code. For example, statement-level classification of code as expendable or non-expendable may be performed not only for if-then-else if-else constructs, but also for a variety of other conditional constructs (e.g., "case" or "switch" statements), for/while loops, as well as other types of constructs, depending on the specific programming language being used.

Example Constrained Computing Environments

Figure 8:
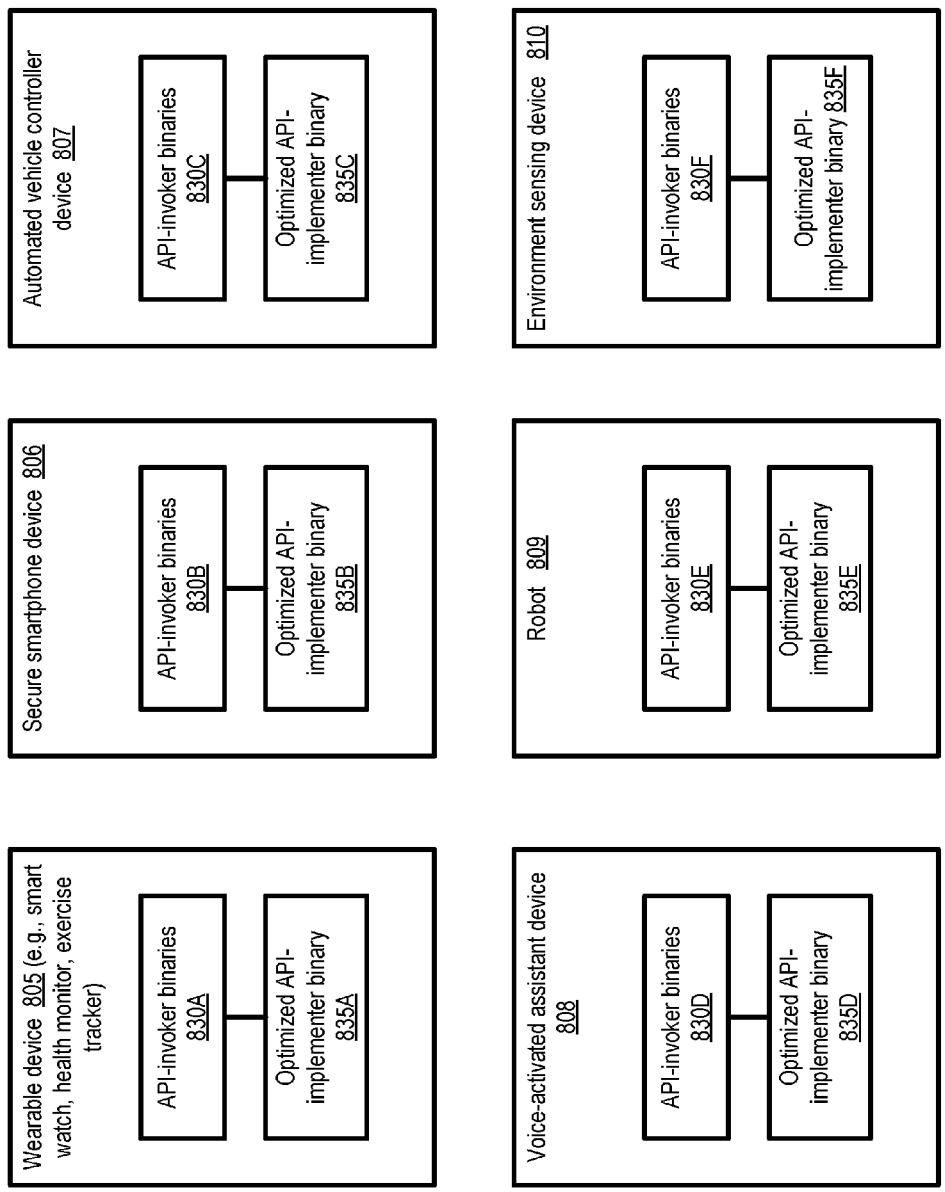
FIG. 8 illustrates several examples of constrained computing environments at which an API-implementer program optimized using fine-grained code analysis may be deployed, according to at least some embodiments.

In the discussion of FIG. 2-FIG. 4, virtualization hosts were used as the examples of constrained computing environments. FIG. 8 illustrates several examples of other types of constrained computing environments at which an API-implementer program optimized using fine-grained code analysis may be deployed, according to at least some embodiments. In general, the depicted examples may represent execution platforms which may have limited memory, storage or other computational resources and limited sets of expected API-invoker programs, and/or environments which may contain sensitive data whose security could be enhanced by eliminating code for portions of the API-implementer code which are not expected to be used.

In some embodiments, a combination of an optimized API-implementer program binary 835A and a matching limited set of API-invoker binaries 830A may be deployed at a wearable computing device 805, such as a smart watch, a health monitoring device or an exercise/fitness tracker. An enhanced-security smart phone 806, e.g., a phone intended to be used by individuals with access to highly confidential data, may also benefit from the use of an optimized API-implementer 835B and a corresponding set of API-invoker binaries 830B in various embodiments. In some such embodiments, for example, the owner of the phone may only be permitted to install a small set of applications on the phone, e.g., after the applications have been analyzed and linked with a matching API-implementer.

Vehicles such as autonomous cars/trucks or cars trucks that are partially-automated (e.g., with parallel parking being automated, or cruise control settings being automatically adjusted) may utilize optimized API-implementers 835C and API-invokers 830C in at least some embodiments, e.g., for various software-managed controllers 807 and the like. Voice-activated home assistant devices 808 (e.g., devices that are designed to perform tasks such as scheduling calendar events, ordering grocery items, playing requested songs, answering factual queries and the like) may also limit the types of API-invoker programs 630D which are permitted, and thus be suitable targets for the types of optimization techniques discussed above.

In some environments robots 809, which may be designed to perform a limited set of tasks, may represent examples of constrained computing environments at which specific domain-dependent combinations of optimized API-implementer binary programs 835E and API-invoker programs 830E may be deployed. Similarly, the results of the kinds of optimization techniques discussed herein (e.g., in the form of the combination of binaries 830F and 835F) may also be applied to various types of environment sensing devices 810, embedded systems and the like in various embodiments. In some cases, the same baseline API-implementer source code (e.g., a selected version of an operating system) may be used as the starting point of the optimizations for a variety of different constrained computing environments, e.g., by a common code analysis/deployment tool or system. As in the virtualization host environments discussed above, several different types of {API-implementer, API-invoker} combinations may exist in at least some of the constrained computing environments shown in FIG. 8. For example, API-implementers may include standard libraries, middleware programs and the like, with the source-code analysis-based optimizations being performed iteratively in a hierarchical or layered sequence as and when appropriate.

Methods for Optimizing API-Implementer Programs

Figure 9:
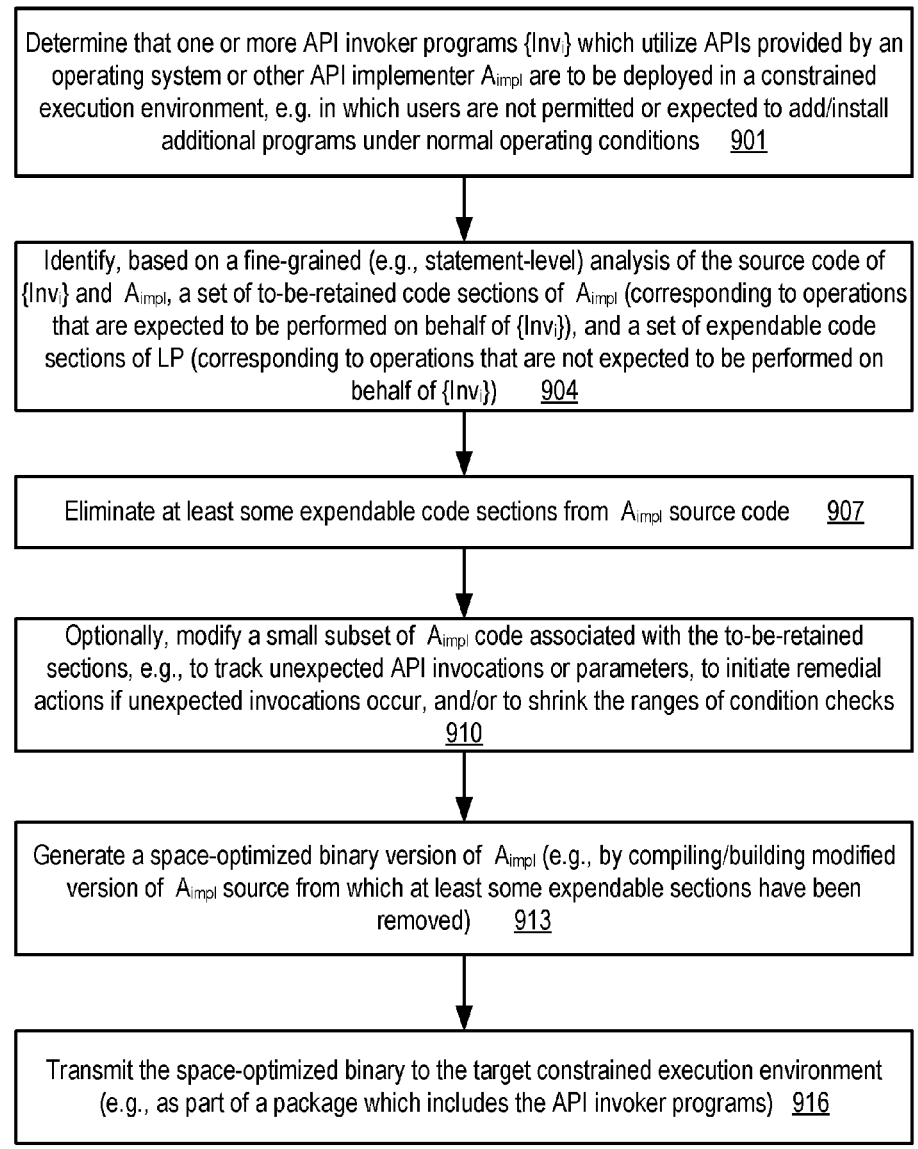
FIG. 9 is a flow diagram illustrating aspects of operations which may be performed to optimize an API-implementer program using fine-grained code analysis, according to at least some embodiments.

FIG. 9 is a flow diagram illustrating aspects of operations which may be performed to optimize an API-implementer program using fine-grained code analysis, according to at least some embodiments. As shown in element 901, a determination may be made, e.g., at a code analysis/deployment tool or system, that a set of API-invoker programs $\{Inv_i\}$ which utilize a set of one or more APIs of an API-implementer program $A_{impl}$ are to be deployed at a constrained computing environment. At the constrained computing environment, the installation or execution of additional API-invoker programs may not be permitted in at least some embodiments. Examples of constrained computing environments may include virtualization hosts of a virtualized computing service, various types of small-memory-footprint devices such as smart watches, phones and the like. Examples of API-implementer programs may include operating systems, API library packages and the like. Examples of API-invokers may include user-mode programs which collectively form a hypervisor (in a scenario in which the constrained computing environment is a virtualization host), applications installed on a phone or a wearable device, software controllers for various devices, and so on. The source code for at least a subset of the API-invokers as well as the API-implementer programs may be available to the tool or system being used for optimization. In some cases, several different API-implementers may be examined collectively for optimization purposes—that is, more than one independently-executable program may be generated from the API-implementer(s) source code in at least some embodiments.

Based on a fine-grained (e.g., statement-level or instruction-level) analysis of the source code of the API-invokers $\{Inv_i\}$ as well as the API-implementer(s) $A_{impl}$, respective source code sections of may be classified as members of a retention set or an expendable set (element 904). The retention set may correspond to operations which are expected to be performed on behalf of the API invokers at the constrained computing environment, while the expendable set may correspond to operations which are not expected to be performed at the constrained computing environment. Some large API-implementer programs may, for example include code for thousands of APIs, of which only a small fraction may be invoked at some constrained computing environments. In some embodiments, identifying only the to-be-retained sections (the retention set) may be sufficient to also identify the expendable set, since the two sets may be mutually exclusive and exhaustive with respect to the source code of the API implementer. After expendable sections have been identified, at least some of the expendable sections may be removed from the original or baseline source code repository or tree to obtain a smaller set of source code which can be compiled/built for deployment (element 907) in the depicted embodiment.

The analysis and classification of the source code may be performed at any combination of several different granularities in different embodiments, such as at an API level and/or at statement level. In some embodiments, a target for the reduction in the source code or memory usage of the API-implementer may be set, and an iterative approach may be used to achieve the target. First, for example, entire libraries or packages which are expendable may be identified and removed from the API-implementer, then (if the target has not been achieved) expendable APIs may be identified and removed, and then (if the target still has not been achieved) expendable statements or code blocks may be identified and removes, until either the target has been attained or no more expendable sections of code can be found. To check whether the target has been achieved, respective optimized versions of the API-implementer binary corresponding to individual iterations may be generated and/or tested using the API invokers. In some embodiments, security enhancement may be at least as much of a priority as resource usage reduction, in which case the analysis may be performed until most or all of the expendable source code has been identified and removed, regardless of whether the target memory/resource footprint has been achieved.

Optionally, in some embodiments, in addition to straightforward elimination of expendable portions of source code, modifications or additions to the baseline source code may also be performed (element 910). Such changes may include, for example, code added to monitor, track or log unexpected API invocations or unexpected parameter values, code added to take remedial actions such as terminating a process which has attempted an unexpected invocation, and/or changes to tighten/shrink the ranges of condition checks. Such changes or additions may not be required for some API-implementers, which may for example already include such code sections.

A space-optimized binary deployable version of the API-implementer(s) may then be generated, e.g., by applying some combination of compilers, build tools and the like (element 913) on the reduced version of the source code from which expendable sections have been eliminated. In at least some embodiments, a single deployable package comprising binaries of the API-invokers $\{Inv_i\}$ and the API-implementer(s) $A_{impl}$ may be generated, which can be transmitted and deployed as a unit, thereby eliminating or reducing the chances of incompatible versions of API-invokers and API-implementers being deployed at a given computing environment. The optimized binary version or package may be transmitted to various instances of the targeted constrained computing environment, where it may be executed (element 916) in the depicted embodiment. In some cases the combination of binaries of the API-implementer and the API-invoker may run for long periods of time (e.g., months or years). Live updates to new versions of the binaries may be supported in some embodiments—e.g., the combination of user-mode hypervisor programs and the operating system used by the hypervisor may be upgraded to a new version without restarting guest virtual machines of the host.

It is noted that in various embodiments, at least some operations other than those illustrated in the flow diagrams of FIG. 9 may be used to implement the optimization techniques described above. Some of the operations shown may not be implemented in some embodiments or may be implemented in a different order, or in parallel rather than sequentially. As discussed earlier, the optimization techniques may be implemented iteratively for respective combinations of API-invokers and API-implementers at various layers of a software stack in at least some embodiments. For example, in an environment in which a standard library is utilized by an application program, and the standard library invokes system calls of an operating system, an optimized version of the standard library may first be generated based on the needs of the application program, and then an optimized version of the operating system may be generated based on the needs of the optimized version of the standard library.

Use Cases

The techniques described above, of reducing the size and resource usage footprint of operating systems and other API implementer programs, which are to be used at constrained computing environments, using fine-grained source code analysis may be beneficial in a variety of scenarios. For example, the resource consumption as well as the security of virtualization managers at the hosts of a virtualized computing service may be improved by preparing compact operating systems which only support the specific sets of system calls and APIs utilized by user-mode hypervisor processes. Similarly, a number of different kinds of special-purpose computing devices, such as environment sensors, wearable computing devices, controllers for vehicle subsystems, personal assistant devices, phones and the like may represent constrained computing environments at which optimized API-implementers may be deployed to reduce costs, battery consumption, and/or to reduce the probability of successful security breaches.

Illustrative Computer System

Figure 10:
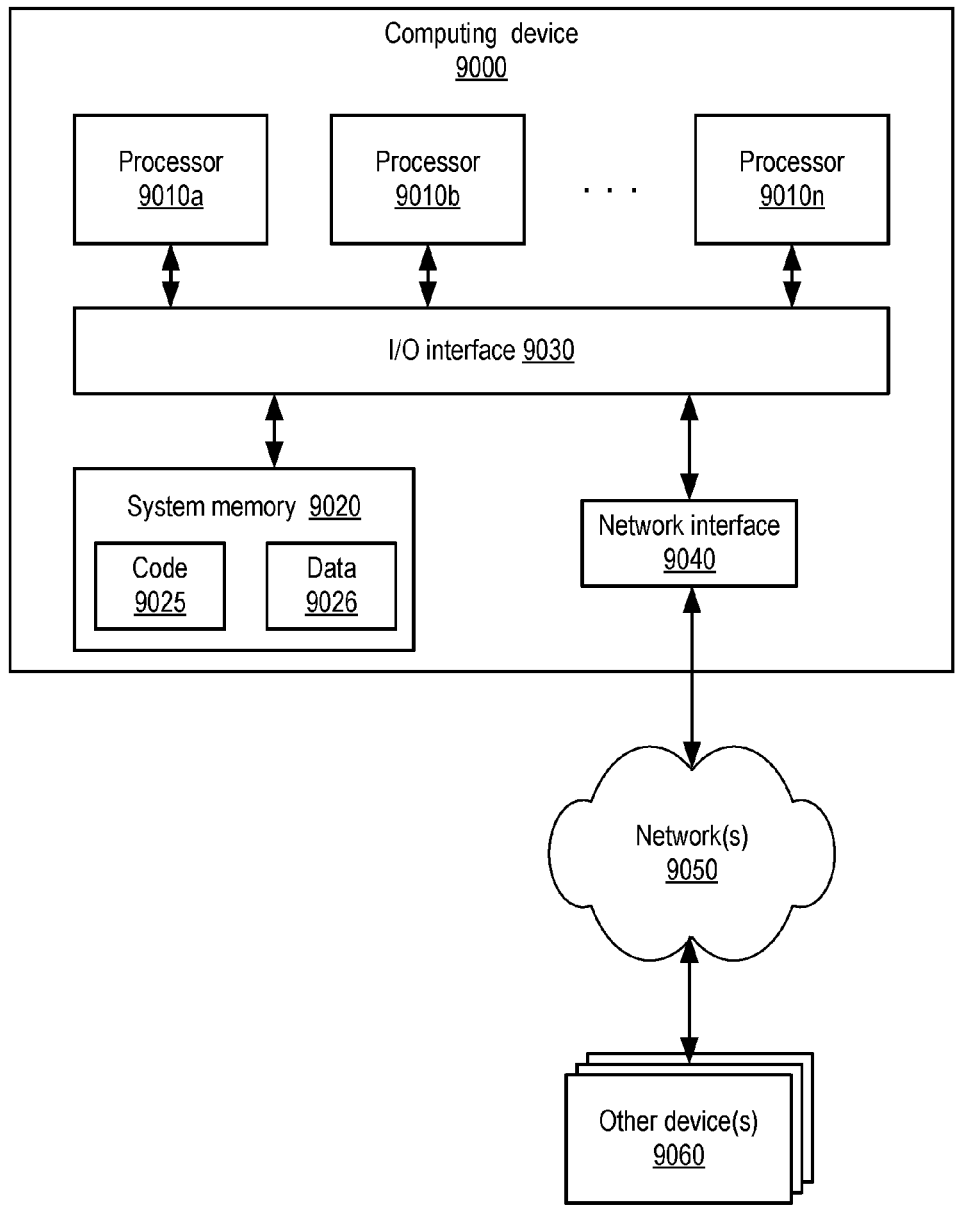
FIG. 10 is a block diagram illustrating an example computing device that may be used in at least some embodiments.

In at least some embodiments, a server that implements a portion or all of one or more of the technologies described herein, including the techniques to implement code analysis, compilation, build and deployment tools that implement the optimizations, as well as the platforms at which the optimized binary versions of API-implementers and/or API-invokers may run, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one physical processor 9010, or a multiprocessor system including several physical processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of offload cards, persistent and/or volatile storage devices and the like. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) or PCI-Express bus standard, or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices are configured to:
obtain an indication of one or more user-mode software programs to be deployed at a constrained computing environment, wherein a deployment policy of the constrained computing environment indicates the particular user-mode software programs whose execution is permitted at the constrained computing environment;
determine, based at least in part on a statement-level analysis of source code of at least one user-mode software program of the one or more user-mode software programs, (a) a retention set of operating system source code sections, and (b) an expendable set of operating system source code sections, wherein the retention set corresponds to operations to be performed on behalf of the one or more user-mode software programs in the constrained computing environment, wherein the expendable set corresponds to operations which are not expected to be performed on behalf of the one or more user-mode software programs, wherein the retention set comprises a particular statement of a particular function, and wherein the expendable set comprises a different statement of the particular function;
generate, using a source code repository of an operating system, a space-optimized binary version of at least a portion of an operating system to be deployed for use by the one or more user-mode software programs at the constrained computing environment, wherein the space-optimized binary version (a) includes executable code corresponding to the retention set and (b) does not include at least some executable code corresponding to the expendable set; and
cause a deployment of at least the space-optimized binary version to the constrained computing environment.

2. The system as recited in claim 1, wherein the one or more computing devices are configured to:
include, within a single deployable package, the one or more user-mode software programs and the space-optimized binary version.

3. The system as recited in claim 1, wherein the constrained computing environment comprises one or more of: a virtualization host, a wearable computing device, a phone, an environmental sensor, a vehicle control device, a voice-activated assistant device, or a robot.

4. The system as recited in claim 1, wherein to generate the space-optimized binary version, the one or more computing devices are configured to:
   delete one or more tokens from a particular source code file of the source code repository.

5. The system as recited in claim 1, wherein to determine the expendable set, the one or more computing devices are configured to:
   determine one or more parameter values passed to the operating system when a particular programmatic interface is invoked from the one or more user-mode software programs.

6. A method, comprising:
   performing, by one or more computing devices:
      determining, based at least in part on an analysis of source code of at least a first API (application programming interface)-invoker program of one or more API-invoker programs to be deployed at a constrained computing environment, an expendable set of source code sections of an API-implementer program, wherein at least one API-invoker program of the one or more API-invoker programs includes an invocation of a particular API of the API-implementer program, wherein the expendable set corresponds to operations which are not expected to be performed on behalf of the one or more API-invoker programs;
      generating, using a source code repository of the API-implementer program, an optimized binary version of the API-implementer program to be deployed with the one or more API-invoker programs at the constrained computing environment, wherein the space-optimized binary version does not include at least some executable code corresponding to the expendable set; and
      causing a transmission of at least the optimized binary version of the API-implementer program to the constrained computing environment.

7. The method as recited in claim 6, wherein the expendable set includes a particular statement of a particular function or method, and wherein the expendable set excludes another statement of the particular function or method.

8. The method as recited in claim 6, wherein the constrained computing environment comprises one or more of: a virtualization host, a wearable computing device, a phone, an environmental sensor, a vehicle controller device, a voice-activated assistant device, or a robot.

9. The method as recited in claim 6, wherein the API-implementer program comprises at least a portion of one or more of: (a) an operating system, (b) a standard library, or (c) a middleware program.

10. The method as recited in claim 6, wherein generating the optimized binary version of the API-implementer program comprises:
    deleting one or more tokens from a particular source code file of the source code repository.

11. The method as recited in claim 6, wherein determining the expendable set comprises:
    identifying one or more parameter values passed to the API-implementer program in the invocation of the particular API.

12. The method as recited in claim 6, further comprising performing, by the one or more computing devices:
    inserting, into the source code repository prior to generating the space-optimized version, source code to store a record of an API invocation with an unexpected parameter value.

13. The method as recited in claim 6, further comprising performing, by the one or more computing devices:
    inserting, into the source code repository prior to generating the space-optimized version, source code to cause an invoker of an API with an unexpected parameter value to be terminated.

14. The method as recited in claim 6, wherein said generating the optimized binary version comprises:
    modifying a configuration file utilized during a preparation of a deployable version of the space-optimized binary version.

15. The method as recited in claim 6, further comprising performing, by the one or more computing devices:
    generating a first deployable package which comprises the optimized binary version and the one or more API-invoker programs, wherein the transmission of at least the optimized binary version comprises a transmission of the first deployable package; and
    causing a live update of a previous version of at least the API-implementer program to be initiated at the constrained computing environment.

16. A non-transitory computer-accessible storage medium storing program instructions that when executed on one or more processors:
    identify, based at least in part on an analysis of source code of at least a first API-invoker program of one or more API-invoker programs to be deployed at a particular computing environment, an expendable set of source code sections of an API-implementer program, wherein at least one program of the one or more API-invoker programs invokes a programmatic interface of the API-implementer program, wherein the expendable set corresponds to operations which are not expected to be performed on behalf of the one or more API-invoker programs;
    generate an optimized binary version of the API-implementer program to be deployed with the one or more API-invoker programs at the particular computing environment, wherein the space-optimized binary version does not include executable code corresponding to the expendable set; and
    cause a transmission of at least the optimized binary version of the API-implementer program to the particular computing environment.

17. The non-transitory computer-accessible storage medium as recited in claim 16, wherein the instructions when executed on the one or more processors:
    include, within a single deployable package, the one or more API-invoker programs and the optimized binary version of the API-implementer program.

18. The non-transitory computer-accessible storage medium as recited in claim 16, wherein the particular computing environment comprises one or more of: a virtualization host, a wearable computing device, a phone, an environmental sensor, a vehicle control device, a voice-activated assistant device, or a robot.

19. The non-transitory computer-accessible storage medium as recited in claim 16, wherein the API-implementer program comprises an operating system.

20. The non-transitory computer-accessible storage medium as recited in claim 16, wherein to identify the expendable set, the instructions when executed on the one or more processors:

determine one or more parameter values passed to the API-implementer program when a particular API is invoked.

\* \* \* \* \*